Patented Aug. 8, 1950

2,517,544

UNITED STATES PATENT OFFICE 2,517,544

COMPOSITIONS COMPRISING AN ACRYLO-NITRILE POLYMERIZATION PRODUCT AND A CYANOALKYLAMINOACETONI-TRILE

Arthur Cresswell, Stamford, Conn., assignor to American Cyanamid Company, New York, N. Y., a corporation of Maine No Drawing. Application December 20, 1947, Serial No. 793,046

13 Claims. (Cl. 260—32.4)

This invention relates to new and useful compositions of matter and more particularly to compositions comprising an acrylonitrile polymerization product and a cyanoalkylaminoacetonitrile. Still more particularly the invention is concerned with compositions of matter comprising (1) polymeric (homopolymeric) acrylonitrile and (2) a compound represented by the general formula

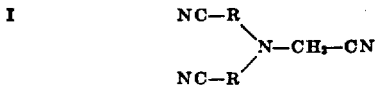

where R represents an alkylene radical containing not more than four, preferably not more than two, carbon atoms, e. g., N,N-di-(cyanomethyl)-aminoacetonitrile, N,N - di - (cyanoethyl) amino-acetonitriles, etc. The alkylene radicals represented by R may be the same or different. The compositions of this invention in which the cyanoalkylaminoacetonitrile is employed primarily as a solvent for the acrylonitrile polymerization product, in which case it constitutes a major proportion (more than 50%), e. g., from 55 to 95%, by weight of the composition, are particularly useful in the production of shaped articles therefrom, e. g., films, filaments, threads, rods, tubes and the like. The cyanoalkylaminoaceto-nitrile also may be used as a plasticizer for an acrylonitrile polymerization product, in which case it constitutes a minor proportion (less than 50%), e. g., from 0.5 to 45%, generally from 1 to 10% (especially when the polymerization product is in the form of a filament or thread), by weight of the composition.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 85% by weight of acrylonitrile, heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc. In my copending application Serial No. 772,201, filed September 4, 1947, I have shown that certain organic thiocyanates are suitable for use in producing solutions of acrylonitrile polymerization products. Various organic solvent solutions of polyacrylonitrile and copolymers of at least 85% by weight of acrylonitrile with another monomer are disclosed in U. S. Patents 2,404,713-728.

The present invention is based on my discovery that polymeric acrylonitrile is compatible with substituted aminoacetonitriles of the kind embraced by Formula I and that the latter are capable of dissolving the acrylonitrile polymerization product to yield solutions which are suitable for use in making mono- and multifilaments, threads, yarns, bars, rods, tubes, films, etc., therefrom. The invention is based on my further discovery that substituted aminoacetonitriles of the kind aforementioned are able effectively to plasticize acrylonitrile polymerization products, so that the latter more easily can be shaped, as by extrusion or molding, into useful articles of manufacture. The substituted aminoacetonitrile may be used either as a fugitive or temporary plasticizer, that is, a plasticizer which subsequently is removed from the polymerization product, or as a permanent plasticizer which is permitted to remain in the shaped polymer.

The substituted aminoacetonitrile does not cause decomposition of, nor appear to react chemically with, the acrylonitrile polymerization product. Furthermore, it can be partly or substantially completely removed from films, threads or other shaped bodies which are produced from the solution, as may be desired or as conditions may require. The solution of the polymerization product is stable over a long period of time.

It was quite unexpected and unpredictable that compounds of the kind embraced by Formula I would be compatible with polymers of acrylonitrile and would be able to dissolve or to plasticize such polymerization products. This was all the more surprising and unobvious when it is considered that other substituted aminoacetonitriles are not operative as solvents for acrylonitrile polymerization products. For example, I have found that polyacrylonitrile is substantially insoluble in N,N-dialkylaminoacetonitriles, specifically N,N-dimethyl- and -diethylaminoaceto-nitriles, and in N-alkyl-N-cyanoalkylaminoacetonitriles, specifically N-methyl-N-cyanomethyl- and N-ethyl-N-cyanoethylaminoacetonitriles.

Illustrative examples of substituted aminoacetonitriles which may be used in practicing the present invention are listed below:

N,N-di-(cyanomethyl) aminoacetonitrile
N,N-di-(cyanoethyl) aminoacetonitriles
N,N-di-(cyanopropyl) aminoacetonitriles
N,N-di-(cyanoisopropyl) aminoacetonitriles
N,N-di-(cyano-n-butyl) aminoacetonitriles
N,N-di-(cyanoisobutyl) aminoacetonitriles
N,N-di-(cyano-sec.-butyl) aminoacetonitriles
N,N-di-(cyano-tert.-butyl) aminoacetonitriles
N-cyanomethyl-N-cyanoethylaminoacetonitriles
N-cyanomethyl - N - cyanopropylaminoacetonitriles
N-cyanomethyl-N-cyano-n - butylaminoacetonitriles
N-cyanoethyl-N-cyanopropylaminoacetonitriles
N-cyanopropyl - N-cyanoisopropylaminoacetonitriles
N-cyanopropyl - N - cyanoisobutylaminoacetonitriles
N-cyanobutyl-N - cyano-sec.-butylaminoacetonitriles
N-cyanomethyl - N - cyano-tert.-butylaminoacetonitriles
N-cyanoethyl-N-cyanopropylaminoacetonitriles
N-cyanoethyl-N-cyanobutylaminoacetonitriles In the above cyanoalkylaminoacetonitriles and in others which may be used, the cyano grouping attached to the alkyl radical may be bonded to any carbon atom of the said radical.

The substituted aminoacetonitriles used in practicing my invention may be prepared in various ways, for example by effecting reaction between a di-(cyanoalkyl) amine represented by the general formula II 

where R has the same meaning as given above with reference to Formula I and glycolonitrile. This reaction may be represented by the following general equation:

III
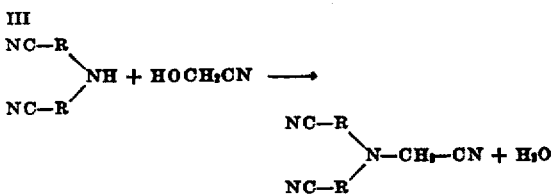

A more detailed description of how the above reaction may be carried out is given below, for purpose of illustration, with particular reference to the preparation of di-(β-cyanoethyl)aminoacetonitrile.

|  | Grams |
|---|---|
| Di-(β-cyanoethyl) amine | 1246 |
| Glycolonitrile (50% aqueous solution) | 1150 |

The glycolonitrile is charged to a reaction vessel and the di-(β-cyanoethyl)amine is added slowly thereto, with stirring, over a period of about 1 hour. Two liters of benzene are added and the water is removed azeotropically with some of the benzene. After removal of the remaining benzene under vacuum, a crude liquid product, which crystallizes after standing for several days, is obtained. The crude crystals of di-(β-cyanoethyl) aminoacetonitrile are dissolved in alcohol, treated with a decolorizing carbon, and the solution then filtered. The purified substituted aminoacetonitrile crystallizes from the alcohol solution as colorless, needle-like crystals melting at 48° C.

Many of the substituted aminoacetonitriles used in practicing my invention, especially the lower homologues, are solids at room temperature. The normally liquid compounds and the solid compounds, when the latter are melted and heated to a temperature above their melting point, are capable of dissolving acrylonitrile polymerization products. The temperature required to dissolve the polymeric acrylonitrile and to form a clear solution varies with, for example, the melting or solidification point of the particular solvent employed, but usually is at least 125° C., e. g., from 130° to 220° C. or higher. Lower temperatures, e. g., 100° C., may be employed in the case of the substituted aminoacetonitriles which are normally liquids. In general, the lowest possible temperature above the melting or solidification point of the substituted aminoacetonitrile and which is consistent with practical considerations, e. g., the time required for effecting solution, should be employed.

Polymeric acrylonitrile is employed in carrying the present invention into effect. These polymers are prepared by methods now well known to those skilled in the art.

Any suitable method of polymerizing the monomeric acrylonitrile may be employed. One suitable method comprises polymerizing the monomer in an aqueous emulsion using a suitable polymerization catalyst, e. g., ammonium persulfate. Other polymerization methods, however, also may be used, e. g., methods such as those described in Bauer et al. U. S. Patent No. 2,160,054. The polymeric acrylonitrile used in practicing my invention may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements by the Staudinger equation (reference: U. S. Patent No. 2,404,713).

The dissolution of the acrylonitrile polymerization product in the liquid or molten substituted aminoacetonitrile is accelerated by using a polymer which is in finely divided state, e. g., one which, if not in finely divided state as originally formed, has been ground so that all or substantially all of it will pass through a U. S. Standard Sieve Series No. 50 screen. It also is usually desirable to agitate the mass, as by mechanical stirring, while dissolving the polymerization product in the solvent.

The proportions of the acrylonitrile polymerization product and substituted aminoacetonitrile in the compositions of my invention may be varied widely, depending mainly upon the particular starting materials employed and the use for which the composition is intended. If the substituted aminoacetonitrile is employed primarily as a solvent for the polymer so as to obtain a film, filament, thread, yarn, rod, tube or other shaped article from which all or substantially all of the solvent subsequently is removed, then the acrylonitrile polymerization product usually constitutes at least 5% but less than 50%, e. g., from 5 to about 20 or 25%, by weight of the composition. If the solution is to be used in the spinning of filaments (mono- or multifilaments) or the casting of films, it is generally preferred that the polymer constitute at least 8%, e. g., from 10 to 20 or 25%, by weight of the composition. The aforementioned ranges of proportions are mentioned as indicative of suitable proportions that may be employed in forming solutions of the polymerization product, and my invention obviously is not limited to the use of only such proportions. Especially in spinning and casting applications of the compositions, the important factor is that the proportions be such that the viscosity of the composition at the operating temperature is within a workable range. Satisfactory viscosities at the operating temperatures usually prevail when the polymer constitutes from 7 or 8% up to 15 or 18% by weight of the composition, but this also is dependent upon the average molecular weight of the polymerization product which may range, for example, from 15,000 or 20,000 up to 150,000 or 200,000, or even as high as 250,000 or 300,000 or more, as determined by the Staudinger equation.

Because the use of the higher amounts of solvent renders spinning operations more costly and difficult due to the trouble often encountered in rapidly removing large amounts of solvent from the solution and due to the cost of such removal, even though the solvent be recovered, it is preferable to use a polymerization product having a molecular weight such that a maximum amount of the polymer, consistent with the viscosity of the solution at the operating temperature, can be dissolved in the substituted aminoacetonitrile. By using acrylonitrile polymerization products having an average molecular weight (Staudinger method) within the range of 35,000 or 40,000 up to 150,000 or 160,000, it is possible to obtain solutions containing from 10 to 25% by weight thereof of the polymer, and having suitable viscosities for use at operating temperatures of the order of 130° to 180° or 200° C. or higher.

The solutions described above may be used in the production of various fabricated structures such, for example, as films, filaments, bars, rods, tubes, etc., in accordance with general techniques and using apparatus now generally known to those skilled in the art, the detailed operating conditions being suitably modified where required.

In making extruded articles such, for example, as filaments, etc., the solution heated to, for instance, 130° to 180° C. or higher, is extruded through a spinnerette or die into a liquid coagulating bath which will coagulate the polymerization product in the spinning solution. The liquid into which the spinning solution is extruded is one which is miscible with the substituted aminoacetonitrile and which, as a result of extracting the solvent, is capable of coagulating the polymerization product. Any liquid which is thus capable of coagulating the polymer may be employed, but preferably the liquid coagulant is one which has no harmful effect upon the polymerization product. Examples of liquid coagulants that may be used are ethylene glycol, triethylene glycol, glycerol, triethanolamine, acetonitrile, ethylene cyanohydrin, n-butanol and aqueous solutions of thiocyanates below the concentration at which the polymer will be dissolved, e. g., a 25% aqueous solution of calcium thiocyanate.

The solubility characteristics of some of the substituted aminoacetonitriles used in practicing the present invention, specifically di-(cyanomethyl)aminoacetonitrile and di-(cyanoethyl)-aminoacetonitrile, are shown in the table.

TABLE

*Solubility characteristics of di-(cyanomethyl) and di-(cyanoethyl) aminoacetonitriles*

| Solvent | Di-(cyanomethyl) aminoacetonitrile | Di-(cyanoethyl) aminoacetonitrile [1] |
| --- | --- | --- |
| Ethylene glycol | Dissolves readily at 80° C.; crystallizes out on cooling. | Readily soluble at 40°-45° C.; no crystallization. |
| Triethylene glycol | Dissolves readily at 75° C.; does not crystallize out. | Dissolves readily at 30°-35° C.; does not crystallize out. |
| Glycerol | Dissolves at 100°-110° C., crystallizes out on cooling. | Dissolves at 52° C.; does not crystallize out. |
| Triethanolamine | Dissolves readily at 80° C.; does not crystallize out on cooling. | Dissolves readily at 65° C.; does not crystallize out on cooling. |
| Acetonitrile | Dissolves readily at room temperature. | Dissolves readily at room temperature. |
| Ethylene cyanohydrin | do | Do. |
| n-Butanol | Dissolves at 80° C.; crystallizes out on cooling. | Dissolves at 60° C.; crystallizes out on cooling. |
| 40% aqueous solution of calcium chloride. | Dissolves somewhat sparingly at 110° C.; crystallizes out on cooling. | Dissolves at 45°-50° C.; crystallizes out on cooling. |
| 25% aqueous solution of calcium thiocyanate. | Dissolves at room temperature | Dissolves at room temperature. |

[1] Di-(β-cyanoethyl) aminoacetonitrile.

It will be understood, of course, by those skilled in the art that the temperature of the liquid coagulating or precipitating bath should be such as to dissolve the solvent from the extruded mass most rapidly and effectively. The length of travel of the shaped article through the bath may be varied as desired or as conditions may require, but in all cases should be sufficiently long to effect solidification of the polymerization product and to extract from the extruded mass all of the solvent or, if desired, only a part of it, leaving the remainder, e. g., from 0.5 to 10% by weight of the whole, in the extruded mass so that it may function as a plasticizer for the polymerization product. One or more sheaves or rolls may be positioned in the bath so as to guide the filament during its formation and to keep it under tension thereafter.

The spun filament or other extruded article is preferably treated in, or after leaving, the coagulating bath in order to orient the molecules and thereby to increase the tensile strength and otherwise to improve the properties of the spun material. Orientation may be effected by stretching the thread or strand at any suitable stage of the spinning operation, but preferably while the spun filament or thread still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200 or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread. Alternatively, the stretched thread may be led over a thread storage device on which it may be treated with water or other suitable solvent to remove all or part of the coagulant and/or substituted aminoacetonitrile, after which it may be continuously dried, oiled and taken up on a twisting device such, for instance, as a ring twisting spindle.

The extruded filament or thread may be given part or all of its total stretch in a liquid medium such as that which constitutes the coagulating bath, or in any other suitable medium, and at a suitable temperature. Thus, the stretch may be applied while the strand is being passed through a gaseous medium, e. g., air, nitrogen, flue gases, etc., or through a liquid medium, e. g., water, or such media as are employed for coagulating the polymerization product. To obviate or minimize discoloration of the polymerization product, the temperature of the medium in which the polymer is stretched and the rate of travel of the strand through the medium should be so adjusted that overheating of the strand does not occur. Ordinarily the temperature of the medium in which stretching is effected is below 200° C., e. g., at 110° to 140° C.

The highly stretched product is strong, tough and pliable, and shows a high degree of orientation along the fiber axis by X-ray diffraction.

The solvent solutions of the acrylonitrile polymerization product also may be cast in the form of films. For instance, the hot, liquid composition may be cast upon a revolving drum which is partly immersed in a coagulating bath, such as mentioned hereinbefore, and which will serve to deposit the polymerization product as a thin film on the drum as it passes through the bath. The resulting film may be stretched, if desired, lengthwise and crosswise by suitable apparatus to improve its properties.

As indicated hereinbefore, the spinning operation can be so conducted as to leave a small amount of the substituted aminoacetonitrile in the polymerization product as a plasticizer therefor. Other means, however, also may be employed for plasticizing a polymer of acrylonitrile with the substituted aminoacetonitrile. For example, a water-swollen filament or thread of polymeric acrylonitrile which has been produced as described in my copending application Serial No. 772,200, filed September 4, 1947, may be treated, as by immersion, with a water, water-alcohol or other solution of the substituted aminoacetonitrile. Or, the aminoacetonitrile plasticizer may be dissolved in an organic solvent, e. g., ethylene glycol, triethylene glycol, glycerol, triethanol amine and others such as previously have been mentioned, and this solution then may be used in treating the water-swollen, stretched or unstretched thread. Since some of the materials which are solvents for the aminoacetonitriles used in practicing the present invention also are capable of functioning as humectants in preserving the gel structure of a water-swollen polymer of acrylonitrile as disclosed and claimed in my copending application Serial No. 772,202 and copending application Serial No. 772,217 of John D. Pollard, both filed September 4, 1947, the treatment with the aminoacetonitrile plasticizer advantageously can be combined with the humectant treatment of the water-swollen or gelled product. Thus, instead of using ethylene glycol, glycerol or other humectant, or mixtures thereof, alone in treating the water-swollen film, thread, etc., the substituted aminoacetonitrile dissolved in a solvent, which also can function as a humectant, may be applied, as by immersion, to the water-swollen polymer. The humectant-solvent then can be removed, as by the use of a preferential solvent, from the stretched or unstretched, dyed or undyed, gelled polymerization product, leaving the substituted aminoacetonitrile as a permanent plasticizer in the finished product.

In order that those skilled in the art better may understand how the present invention may be carried into effect, the following examples are given by way of illustration and not by way of limitation. All parts and percentages are by weight.

*Example 1*

A mixture of 90 parts of di-(cyanomethyl)-aminoacetonitrile and 10 parts of finely divided polymeric acrylonitrile is heated, yielding a solution which is cloudy at 150° C. but gradually clears as heating is continued to 205° C. On cooling, the polymer remains in solution until a temperature of 125° C. is reached, at which point the solvent begins to crystallize, but a clear solution again is obtained upon reheating to a temperature above 130° C.

Upon extruding this solution maintained at 135° C. through a spinnerette into a coagulating bath of ethylene glycol maintained at 130° C., a filament or thread of polymeric acrylonitrile is formed.

A solution produced by dissolving 1 gram of the polyacrylonitrile used in this example in 60% aqueous sodium thiocyanate to make 100 ml. at 20° C. had a viscosity of 19.2 centipoises at 40° C.

*Example 2*

A mixture of 90 parts of di-(cyanoethyl)aminoacetonitrile and 10 parts of finely divided polymeric acrylonitrile (same as that used in Example 1) is heated to 198°–202° C., yielding a clear solution which becomes cloudy when cooled to 185°–188° C. and gels at 170°–180° C. A clear solution again is obtained upon reheating to 190°–193° C. or higher.

Upon extruding this solution maintained at 200° C. through a spinnerette into a coagulating bath of triethanolamine maintained at 110° C., a filament or thread of polymeric acrylonitrile is formed.

The di-(cyanoethyl)aminoacetonitrile employed in Example 2 was di-(β-cyanoethyl) aminoacetonitrile.

It will be understood, of course, by those skilled in the art that my invention is not limited to the specific ingredients, operating conditions and procedures given in the above illustrative examples. Thus, instead of di-(cyanomethyl)aminoacetonitrile or di-(cyanoethyl)aminoacetonitrile, any other substituted aminoacetonitrile of the kind embraced by Formula I, numerous examples of which have been given hereinbefore, or mixtures thereof may be employed.

Likewise, instead of extruding the liquid solution through a spinnerette as described in the examples, a homogeneous, intimate mixture of the polymerization product and the solid substituted aminoacetonitrile may be fed into a worm-fed extruder, wherein it is melted and homogenized, and thereafter extruded in the desired shape, e. g., as a monofilament, tape, bar, rod, etc., into a suitable liquid coagulant (examples of which previously have been given), maintained at a suitable temperature, e. g., ethylene glycol at a temperature of 125°–180° C. The extruded article is then stretched to orient the molecules and to impart strength and toughness to the shaped object. The coagulating liquid containing the substituted aminoacetonitrile dissolved therein is then cooled until the cyano derivative crystallizes out, after which the latter is separated, as by filtration or centrifuging, and re-used in the process.

From the foregoing description it will be seen that the present invention provides compositions comprising homopolymeric acrylonitrile and, either as a plasticizer or as a solvent therefor, a single substituted aminoacetonitrile of the kind embraced by Formula I, or a plurality of such compounds. Thus, instead of using di-(cyanomethyl)aminoacetonitrile alone, I may use a mixture thereof with di-(cyanoethyl)aminoacetonitrile.

The compositions of this invention may be shaped or fabricated, as by extrusion, molding, casting, etc., into a wide variety of useful articles. Lubricants, anti-static agents and other conventional modifiers of acrylonitrile polymerization products may be incorporated therein at any suitable stage of the operation. Other and more specific examples of modifiers that may be employed are given in my aforementioned copending applications, as well as in the prior art patents hereinbefore acknowledged.

Although not limited thereto, the compositions of this invention are particularly useful in the production of filaments, threads, yarns, etc., which thereafter are woven into fabrics. Other uses include those given in the aforementioned patents.

The term "filament" as used generically herein and in some of the appended claims is intended to include within its meaning both monofilaments and multifilaments.

I claim:

1. A composition of matter comprising (1) homopolymeric acrylonitrile and (2) a compound represented by the general formula

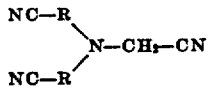

where R represents an alkylene radical containing not more than four carbon atoms.

2. A composition as in claim 1 wherein the compound of (2) is N,N-di-(cyanomethyl)aminoacetonitrile.

3. A composition as in claim 1 wherein the compound of (2) is N,N-di-(cyanoethyl)aminoacetonitrile.

4. A composition as in claim 1 wherein the homopolymeric acrylonitrile of (1) has an average molecular weight within the range of 15,000 to 300,000.

5. A composition as in claim 1 wherein the homopolymeric acrylonitrile of (1) constitutes at least 10% by weight of the composition.

6. A composition of matter comprising homopolymeric acrylonitrile dissolved in a compound represented by the general formula

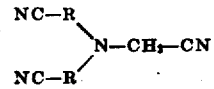

where R represent an alkylene radical containing not more than four carbon atoms.

7. A composition adapted for the production of films, filaments, threads, rods, tubes and the like comprising N,N-di-(cyanomethyl)aminoacetonitrile having dissolved therein homopolymeric acrylonitrile.

8. A composition adapted for the production of films, filaments, threads, rods, tubes and the like comprising N,N-di-(cyanoethyl)aminoacetonitrile having dissolved therein homopolymeric acrylonitrile.

9. A plasticized composition comprising homopolymeric acrylonitrile plasticized with a plasticizing amount not substantially exceeding 10% by weight of the composition of a plasticizer comprising a compound represented by the general formula

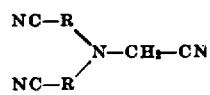

where R represents an alkylene radical containing not more than four carbon atoms.

10. Homopolymeric acrylonitrile plasticized with from 1 to 10% by weight of the whole of N,N-di-(cyanomethyl)aminoacetonitrile.

11. Homopolymeric acrylonitrile plasticized with from 1 to 10% by weight of the whole of N,N-di-(cyanoethyl)aminoacetonitrile.

12. A filament which shows orientation along the fiber axis and which comprises homopolymeric acrylonitrile plasticized with from 1 to 10% by weight of the whole of a plasticizer comprising a compound represented by the general formula

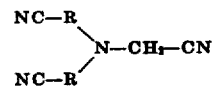

where R represent an alkylene radical containing not more than four carbon atoms.

13. A filament which shows orientation along the fiber axis and which comprises homopolymeric acrylonitrile plasticized with from 1 to 10% by weight of the whole of a plasticizer comprising N,N-di-(cyanomethyl)aminoacetonitrile.

ARTHUR CRESSWELL.

REFERENCES CITED

The following references are of record in the file of this patent:

UNITED STATES PATENTS

| Number | Name | Date |
|---|---|---|
| 2,404,715 | Rogers | July 23, 1946 |

Certificate of Correction

Patent No. 2,517,544                                                  August 8, 1950

ARTHUR CRESSWELL

It is hereby certified that error appears in the printed specification of the above numbered patent requiring correction as follows:

Columns 5 and 6, in the table, last column thereof, fourth line from bottom, after the word "on" insert *cooling*; column 10, lines 14 and 54, for "represent" read *represents*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*